R. E. DUNHAM.
LAND ROLLER.
APPLICATION FILED AUG. 21, 1916.

1,237,182.

Patented Aug. 14, 1917
2 SHEETS—SHEET 1.

Inventor
R. E. Dunham
by
his Attorney

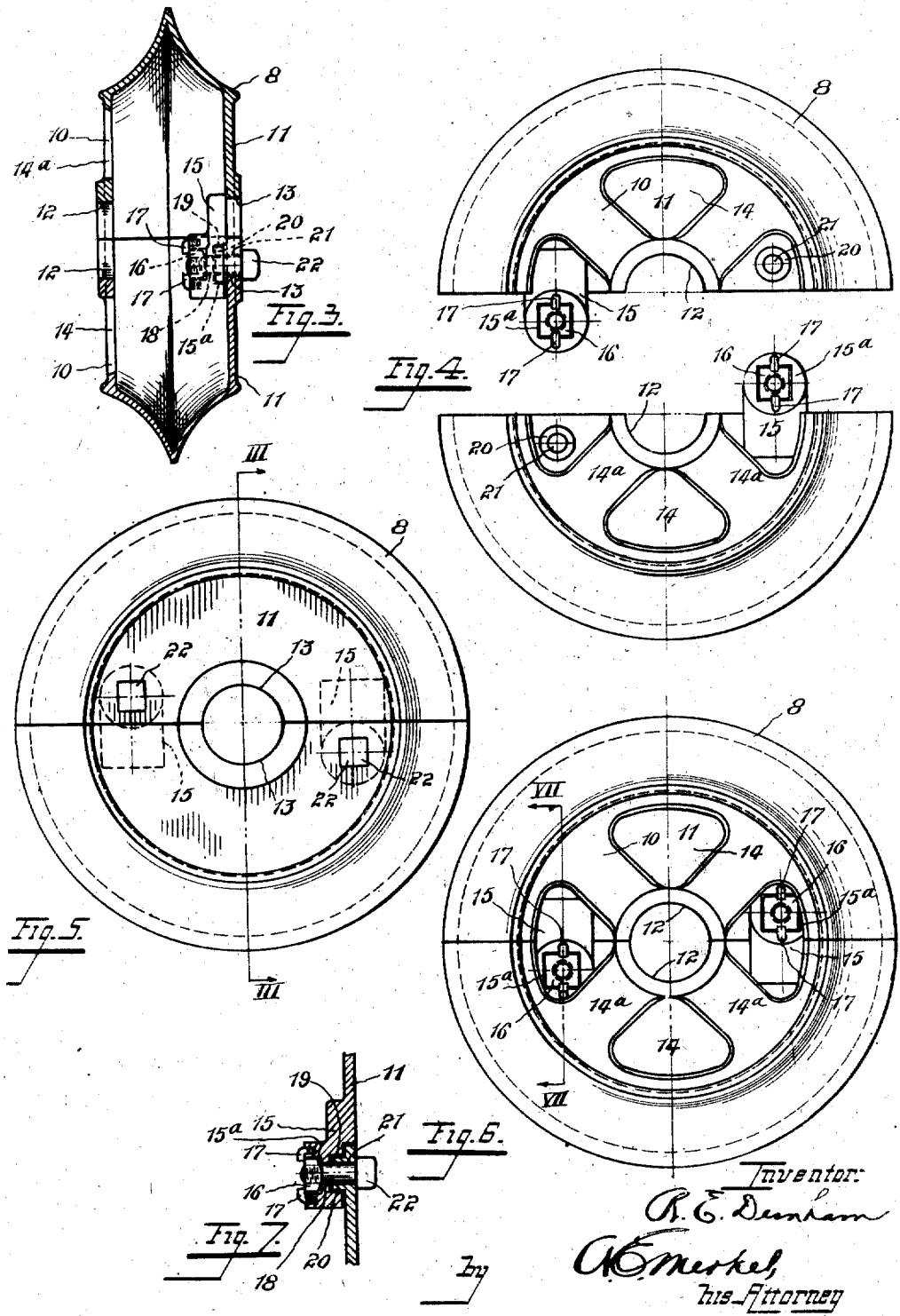

UNITED STATES PATENT OFFICE.

RAY E. DUNHAM, OF CLEVELAND, OHIO, ASSIGNOR TO THE DUNHAM COMPANY, OF BEREA, OHIO, A CORPORATION OF OHIO.

LAND-ROLLER.

1,237,182.     Specification of Letters Patent.     Patented Aug. 14, 1917.

Application filed August 21, 1916. Serial No. 116,140.

*To all whom it may concern:*

Be it known that I, RAY E. DUNHAM, a citizen of the United States, resident of Cleveland, county of Cuyahoga, and State of Ohio, have invented a new and useful Improvement in Land-Rollers, of which the following is a specification, the principle of the invention being herein explained and the best mode in which I have contemplated applying that principle, so as to distinguish it from other inventions.

My invention relates to land rollers, and particularly to land rollers in which there is employed a gang of hollow roller wheels loosely mounted upon an axle carried by a suitable frame.

The object of the invention is to provide a construction whereby the end disks of the land roller may be readily removed so as to permit of the formation of a central open space whereby rows of the growing grain may be avoided while the soil between the rows is being cultivated or pulverized.

The said invention consists of means hereinafter fully described and particularly set forth in the claims.

The annexed drawings and the following description set forth in detail certain means embodying my invention, the disclosed means, however, constituting but one of various mechanical forms in which the principle of the invention may be employed.

In said annexed drawings:—

Fig. 3 represents a vertical axial section of one of the end disks.

Fig. 4 represents a side elevation of such end disk, showing the two parts separated from each other.

Fig. 5 represents an elevation, taken from the opposite side from that shown in Fig. 4, of such end disk and showing the two parts connected.

Fig. 6 represents a view similar to Fig. 5 showing the other side of the disk.

Fig. 7 represents a section of a detail portion of one of said end disks, taken upon line VII—VII, Fig. 6.

Figure 1:
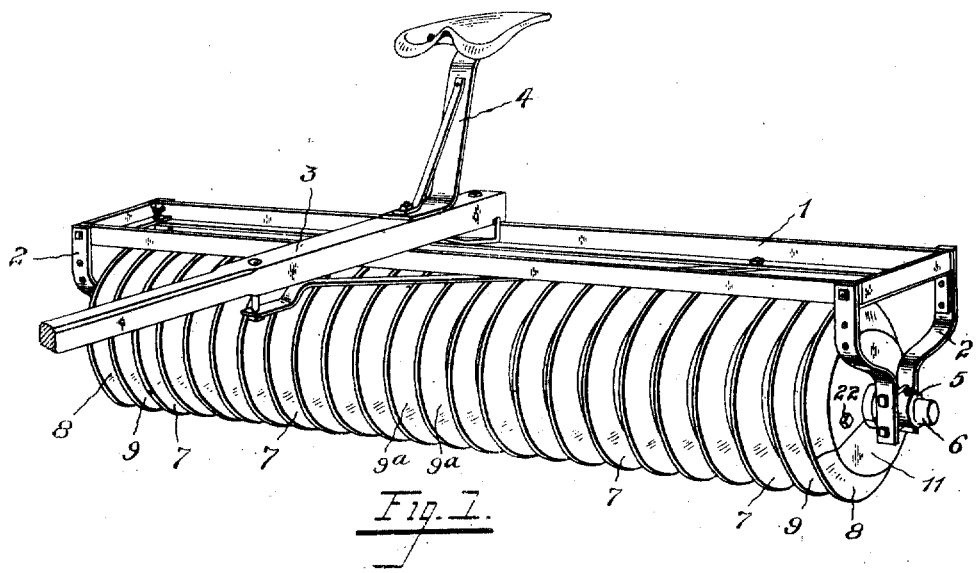
Figure 1 represents a perspective view of a land roller or pulverizer embodying my invention.

The illustrated embodiment of my invention comprises any suitable frame 1 provided with end frames 2, 2 and having secure thereto an ordinary tongue 3 upon which is mounted the seat 4. The end or side frames 2 each carries a bearing 5 in which is mounted, either rotatably or fixed, the axle 6. Upon this axle are loosely mounted a multiplicity of roller or pulverizer disks 7, as will be readily understood.

Instead, however, of forming all of these disks exactly alike, as has heretofore been the custom, the end disks 8, 8, and the disks immediately adjacent thereto. namely disks 9, 9, are modified in structure.

The extreme or end disks 8 are each formed of two parts separable upon a plane passing through the disk's axis, as shown in Figs. 3 and 4. Each of these parts is hollow and is formed with two side webs 10 and 11. Each of these webs is formed with a semi-circular bearing 12 and 13 respectively, which when the parts are assembled, together form bearings for the reception of the axle. The webs 11 are made imperforate as shown in Fig. 5, but the webs 10 are provided with openings 14, forming spokes 14ª, this arrangement being provided to conserve material and render the structure as light as possible. When the two disk parts are secured to each other, and the wheel mounted upon the axle, webs 11 form an imperforate side wall and webs 10 a spoked side wall of the disk.

Each of the webs 11 of the disk 8, is formed with an integral lug 15, these lugs projecting beyond the edge of their respective parts and adjacent to the inner surface of the webs 11 of the other part, as shown in Fig. 6. The inner side of each of these lugs is provided with a square recess 15ª in which is seated a nut 16 and this nut is held securely in place by means of bent pins 17, driven or screwed into the lugs. Each recess 15ª registers with a corresponding bolt-hole 18 in the lug and this bolt-hole is provided with an enlargement or cylindrical recess 19 upon its outer side. Each of the webs 11 is provided with a cylindrical boss 20 which fits into the corresponding recess 19 of the adjacent lug. When bosses 20 and lugs 19 engage each other, the two disk parts are coaxial, that is, they occupy their desired assembled position, as shown in Fig. 3. Bolt-holes 21 extend through each wall 11 and when the parts are assembled register with holes 18 respectively. Suitable bolts 22 pass through these bolt-holes and engage the nuts 16, thus securing the two parts together.

It will thus be seen that by unscrewing the bolts 22, the parts of the two end disks 8 may be separated and thus removed from the axle. When so removed the disks on each side of the center of the axle may be shifted toward the ends thereof, as shown in Fig. 2, and held in place by means of split collars 23 (only one being visible in Fig. 2), thus forming the required intermediate space 24.

The wall formed of webs 11 being made imperforate, it will be seen that when the parts are in the position shown in Fig. 1, the outer end of the gang of rollers is closed, thus preventing the ingress of dirt into the interior of the gang.

Figure 2:
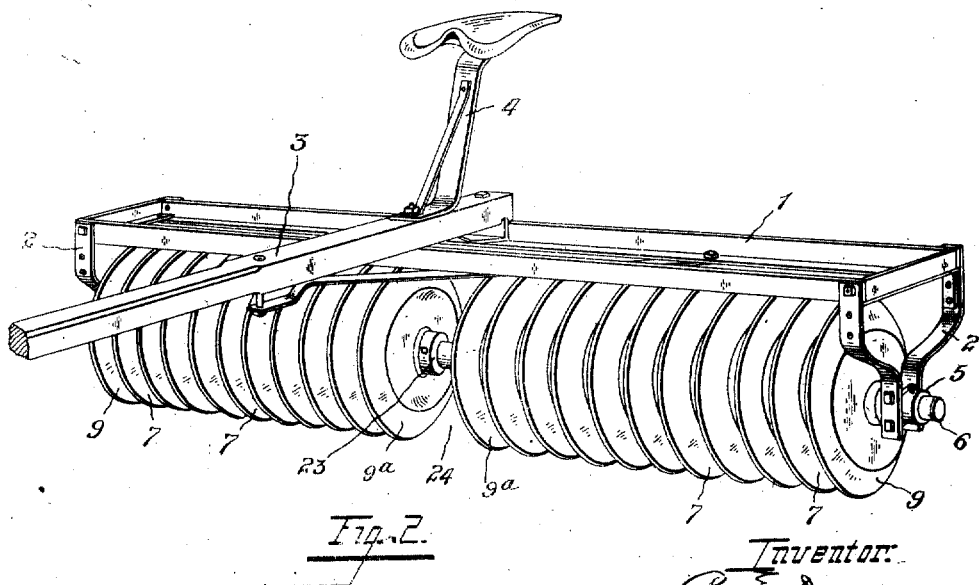
Fig. 2 represents a view similar to Fig. 1, showing the two end rollers removed and the intermediate space formed.

Each disk 9, above-mentioned, has its outer side-wall imperforate, as shown in Fig. 2, so that when the disks 8 are removed, the ends of the gang will still present imperforate sides or ends and thus also prevent the ingress of dirt as before.

The two center disks 9ª, 9ª, may also be constructed so as to have their opposing faces imperforate, as shown, so that their construction will be exactly similar to that of disks 9, 9, with one side wall spoked and the other imperforate.

It will thus be seen that by means of the above-described structure, the desired intermediate or middle space may be readily formed by reason of the ready removal of the end disks 8, and that also the ends of the gang, under both sets of conditions above-mentioned, are closed to the ingress of dirt into the interior.

Having fully described my invention, what I claim and desire to secure by Letters Patent is:—

1. A disk for land rollers comprising two members separable completely from each other upon a plane passing through the axis; each member being hollow and having two side webs formed with a semi-circular bearing co-axial with the axis of the disk; together with means for securing said two disk members to each other; one of said webs, when the parts are assembled, forming a closure, whereby entrance of substances therethrough and into the interior of the disk is prevented.

2. A disk for land rollers comprising two members completely separable from each other upon a plane passing through the disk's axis; each member being hollow and having two side webs formed with a semi-circular bearing co-axial with the axis of the disk, each of the two separable parts of said web being provided with a lug; and means for the securing of said lugs, respectively, to the contiguous and other portion of said web; one of said webs, when the parts are assembled, forming a closure, whereby entrance of substances therethrough and into the interior of the disk is prevented.

3. A disk for land rollers comprising two parts separable upon a plane passing through the disk's axis; each part being hollow and having two side webs, each of the latter being formed with semi-circular bearing portion coaxial with the disk's axis; each of said side webs located upon the same side of the disk being provided with an integral lug, the lug of the one part projecting into a position adjacent to the inner surface of the other part; and means for securing each of said lugs to the other part.

4. A disk for land rollers, comprising two parts separable upon a plane passing through the disk's axis; each such part being hollow and having two side webs, each of the latter being formed with a semi-circular bearing portion coaxial with the disk's axis; each of the side webs of said disk which are on the same side of the disk, being provided with an integral lug projecting into a position adjacent to the inner surface of the other disk part; each of said lugs being provided with a bolt-hole and recess, and each of the disk parts being provided with a bolt-hole registering with said first-named bolt-hole; a nut secured in each of said recesses; and bolts passing through said bolt-holes respectively and engaging said nuts.

5. A disk for land rollers, comprising two parts separable upon a plane passing through the disk's axis; each such part being hollow and having two side webs, each of the latter being formed with a semi-circular bearing portion coaxial with the disk's axis, and with an integral lug projecting so as to occupy a position adjacent to the inner surface of the other part; each of said lugs being provided with a bolt-hole having its axis parallel with the disk's axis, each such part being also provided with a bolt-hole registering with the bolt-holes of the adjacent lugs; the inner surface of each disk part adjacent to the second-named bolt-hole being provided with a boss, and the outer portion of each of said lugs being provided with a recess, said recesses being adapted to receive said bosses; bolts passing through said registering bolt-holes and nuts for securing said bolts.

6. In a land roller, the combination of a suitable frame; an axle mounted upon said frame; and a gang of hollow disks mounted upon said axle; the outer sides of one of the end disks and the outer side of the disk next adjacent thereto, being closed; the end disk being separable upon a plane passing through its axis and removable from the axle; two of the adjacent and intermediate disks in addition having contiguous sides closed.

7. A land roller consisting of the combination of a suitable frame; a straight axle mounted on said frame; and a plurality of disks rotatably mounted upon said axle; one of the end disks of said plurality of disks being arranged so as to be removable from the axle and transversely with respect to the axis thereof, whereby such removal may be effected without dismounting the axle, and the disks may be shifted toward the axle's end to form an intermediate free space in the gang.

8. A disk for land rollers comprising two members completely separable from each other upon a plane passing through the axis; each member being hollow and having two webs formed with a semi-circular bearing coaxial with the axis of the disk; each of the two separable parts of one of said webs being provided with a lug and means for securing said lugs, respectively, to the contiguous or other portions of said web.

9. In a land roller, the combination of a suitable frame; an axle mounted upon said frame; and a gang of hollow disks mounted upon said axle; the outer sides of one of the end disks and the outer side of the disk next adjacent thereto, being closed, the end disk being separable upon a plane passing through its axis and removable from the axle.

Signed by me, this 18th day of August, 1916.

RAY E. DUNHAM.